United States Patent
Watanabe

(10) Patent No.: US 7,475,400 B2
(45) Date of Patent: Jan. 6, 2009

(54) DATABASE SYSTEM AND INFORMATION PROCESSING SYSTEM WITH PROCESS CODE INFORMATION

(75) Inventor: Yutaka Watanabe, Sendai (JP)

(73) Assignee: International Business Machines Corporation, Armonk, NY (US)

(*) Notice: Subject to any disclaimer, the term of this patent is extended or adjusted under 35 U.S.C. 154(b) by 972 days.

(21) Appl. No.: 09/875,629

(22) Filed: Jun. 6, 2001

(65) Prior Publication Data
US 2002/0016810 A1   Feb. 7, 2002

(30) Foreign Application Priority Data
Jun. 9, 2000   (JP)   ............................. 2000-174558

(51) Int. Cl.
G06F 9/46   (2006.01)
G06F 7/00   (2006.01)
G06F 12/00  (2006.01)

(52) U.S. Cl. .................... 718/106; 707/104.1; 707/201; 705/5; 705/8; 705/9

(58) Field of Classification Search ......... 718/100–108; 705/5–9; 707/104.1, 201
See application file for complete search history.

(56) References Cited

U.S. PATENT DOCUMENTS

| | | | | |
|---|---|---|---|---|
| 5,301,320 A * | 4/1994 | McAtee et al. | ................... | 705/9 |
| 5,933,633 A * | 8/1999 | Good et al. | ................... | 717/131 |
| 6,401,111 B1 * | 6/2002 | Dan et al. | ................... | 709/204 |
| 6,405,215 B1 * | 6/2002 | Yaung | ..................... | 707/104.1 |
| 6,415,297 B1 * | 7/2002 | Leymann et al. | ............ | 707/201 |
| 6,631,354 B1 * | 10/2003 | Leymann et al. | ................ | 705/8 |
| 6,826,579 B1 * | 11/2004 | Leymann et al. | ............ | 717/131 |
| 6,853,974 B1 * | 2/2005 | Akifuji et al. | .................. | 705/9 |

(Continued)

FOREIGN PATENT DOCUMENTS

JP   10-63751   6/1998

(Continued)

OTHER PUBLICATIONS

Gaido, Shisutemu. "Hitachi-WorkCoordinator System Manager's Guide". Full Translation. Reference cited in IDS filed Aug. 8, 2007.*

(Continued)

*Primary Examiner*—Meng-Ai An
*Assistant Examiner*—Jennifer N To
(74) *Attorney, Agent, or Firm*—Scully, Scott, Murphy & Presser, P.C.; Ronald A. Kaschak, Esq.

(57) ABSTRACT

System (software) development is performed based on a state transition diagram. The workflow of a business process is partitioned for each event therein and assigns process codes to the respective process results. A process code is an identification code to indicate a certain state of a process. For example, a process code AA is assigned to the waiting state before completion of a process A, and a process code AB is assigned to the completion state thereof, wherein the process code AB is set as a condition to start a process B. The process codes that are set based on the state transition diagram are managed in an external database (DB) so that flexible modification of the state transition configuration and the state transition order is possible. This provides an entirely new method of system design that facilitates business process reengineering.

3 Claims, 4 Drawing Sheets

| State transition | Sequence 0 | | | | | Sequence 1 | | | | | Sequence 2 | | | | |
|---|---|---|---|---|---|---|---|---|---|---|---|---|---|---|---|
| State \ Process | s01 | s02 | s03 | s04 | State after completion of process | s11 | s12 | s13 | s14 | State after completion of process | s21 | s22 | s23 | s24 | State after completion of process |
| p00 | - | - | - | - | s01 | | | | | | | | | | |
| p01 | y | | | | - | - | - | - | - | s11 | | | | | |
| p01' | y | | | | s02 | | | | | | | | | | |
| p02 | | y | | | - | | | | | s11 | | | | | |
| p02' | | y | | | s03 | | | | | | | | | | |
| p11 | | | | | | y | | | | s12 | | | | | |
| p12 | | | | | | | y | | | - | - | - | - | - | s21 |
| p12' | | | | | | | y | | | s13 | | | | | |
| p13 | | | | | | | | y | | s14 | | | | | |
| p14 | | | | | s03 | | | | y | - | | | | | |
| p21 | | | | | | | | | | | y | | | | s22 |
| p22 | | | | | | | | | | | | y | | | s23 |
| p23 | | | | | | | | | | | | | y | | s24 |
| p24 | | | | | | | | y | | | | | | y | - |

U.S. PATENT DOCUMENTS

| | | | |
|---|---|---|---|
| 7,024,669 B1 * | 4/2006 | Leymann et al. | 718/100 |
| 7,024,670 B1 * | 4/2006 | Leymann et al. | 718/102 |
| 7,275,039 B2 * | 9/2007 | Setteducati | 705/8 |
| 2002/0032692 A1 * | 3/2002 | Suzuki et al. | 707/200 |
| 2002/0152254 A1 * | 10/2002 | Teng | 709/100 |
| 2002/0184293 A1 * | 12/2002 | Cheeniyil et al. | 709/103 |

OTHER PUBLICATIONS

Miller et al., "Cobra-Based Run-Time Architectures for Workflow Management Systems", Citeseer, 1996, pp. 1-24.*

Sheth ety al., "Supporting State-Wide Immunization Tracking Using Multi-Paradigm Workflow Technology", 1996, pp. 263-273.*

T. Yoda, A. Matsumoto, "Business Rule-based Development Method—New Trend of Application Development to Connect Developers with Business" Network Computing, 1998.9.1, vol. 10, No. 9 pp. 55-67.

Hitachi, Ltd., Work Coordinator System Administrator Guide, 2$^{nd}$ Edition, dated Mar. 31, 1999 (pp. 2-3, 16, 22, 31, 37, 45-46).

* cited by examiner

| State transition / Process | Sequence 0 | | | | | Sequence 1 | | | | | Sequence 2 | | | | |
|---|---|---|---|---|---|---|---|---|---|---|---|---|---|---|---|
| | Starting condition | | | | State after completion of process | Starting condition | | | | State after completion of process | Starting condition | | | | State after completion of process |
| | s01 | s02 | s03 | s04 | | s11 | s12 | s13 | s14 | | s21 | s22 | s23 | s24 | |
| p00 | - | - | - | - | s01 | | | | | | | | | | |
| p01 | y | | | | - | - | - | - | - | s11 | | | | | |
| p01' | y | | | | s02 | | | | | | | | | | |
| p02 | | y | | | - | | | | | s11 | | | | | |
| p02' | | y | | | s03 | | | | | | | | | | |
| p11 | | | | | | y | | | | s12 | | | | | |
| p12 | | | | | | | y | | | - | - | - | - | - | s21 |
| p12' | | | | | | | y | | | s13 | | | | | |
| p13 | | | | | | | | y | | s14 | | | | | |
| p14 | | | | | s03 | | | | y | - | | | | | |
| p21 | | | | | | | | | | | y | | | | s22 |
| p22 | | | | | | | | | | | | y | | | s23 |
| p23 | | | | | | | | | | | | | y | | s24 |
| p24 | | | | | | | | | | s13 | | | | y | - |

DATABASE SYSTEM AND INFORMATION PROCESSING SYSTEM WITH PROCESS CODE INFORMATION

DETAILED DESCRIPTION OF THE INVENTION

The present invention relates to a database that is useful for software development, in particular for development of software which comprise many complex processes.

BACKGROUND OF THE INVENTION

A business transaction may comprise very complex processes. For example, business transactions like purchasing and procurement in a large company comprises many processes such as application, approval, keeping records for audits, and official classification, which results in a very complex workflow. To systematize such a complex workflow to construct (develop or integrate) a system (software), modeling schemes such as ITT (Information Through Timing) model, OSW (Office of Secretaries of War) model, SADT (Structured Analysis & Design Technique), and other common workflow diagrams or data flow diagrams (DFDs) are used. However, visualization with any of these schemes is difficult and cam be carried out inadequately.

On the other hand, the processes in a company may be frequently changed for improvement and enhancement. After constructing a system by systematizing these business processes, if improvements or changes are to be made to the system for business process reengineering, it is necessary to modify the system design and, sometimes, to review the earlier stages, such as requirements definition and external design. This involves significant effort, cost, and time. Further, in this situation, it is difficult for the system developer to respond to requests for the modification from the system users, flexibly and promptly.

Thus, when reengineering such systems, system developers must review the developed systems beginning with the initial stage of the development (requirements definition or external design) depending on the scale of the reengineering. In addition, verification for the reengineering may require time and cost equal to or greater than those in verification for new development. Moreover, even when only a part of the system is changed, all the associated parts have to be reviewed for any changes and influences on them. As a result, there are cases where a business transaction performed by system users is adapted to the system instead of the system adapted to the business transaction of the users. This has been a significant problem.

SUMMARY OF THE INVENTION

The object of the present invention is to provide a mechanism that can minimize risk in a system development as well as efforts, costs, and time for the improvements and changes.

Another object of the present invention is to provide a method of system development that allows responding to requests for business process reengineering of such business processes in a flexible and immediate manner. This also provides expandability for system construction or system integration at the same time.

System design using the present invention is based on a state transition diagram. Specifically, in the present invention, the workflow of a business process is partitioned for each event, and process codes are assigned to the respective process results. A process code is an identification code to indicate a certain state of a process. For example, a process code AA is assigned to the waiting state before completion of a process A, and a process code AB is assigned to the completion state thereof, wherein the process code AB is set as a condition to start a process B. The process codes that are set based on the state transition diagram are managed in an external database (DB) so that flexible modification of the state transition configuration and the state transition order is possible. This provides an entirely new method of system design that facilitates business process reengineering.

Since the execution order of the processes is managed in the process code management DB, the developer who reengineers his system can accommodate changes in the business transaction in a flexible, immediate, and efficient manner by only overwriting process codes being currently executed. Users of the system themselves may also modify the processes, depending on the degree of modification to be made. In addition, the use of a state transition diagram that can be easily visualized, significantly improves modeling of a complex workflow.

More specifically, the present invention is achieved by providing a database system separated from an application (a system) that actually executes processes for performing business operations. This database system comprises 1) identification information on each process, and 2) process code information that is set for each process to indicate a state of the process. The process code information contains information indicating states that are conditions to start the respective processes, and information indicating states after completion of the respective processes. The process code information is obtained from previously created state transition data of the processes. Therefore, if changes are made to the business operations, modification of the whole system is not required since modification of the database system can change the workflow of the processes. This provides a method of system development that flexibly accommodates changes.

The present invention is also provided as an information processing system, which comprises the above mentioned database system, an application system that actually executes each process, and determination means (determination engine) for determining if the process is executable or not. The determination means determines if the processes are executable or not by referring to the corresponding process code information on the processes in the database system in response to a call from the application system.

BRIEF DESCRIPTION OF THE DRAWINGS

Embodiments of the present invention will be described with reference to the drawings, in which.

DETAILED DESCRIPTION OF THE INVENTION

Figure 1:
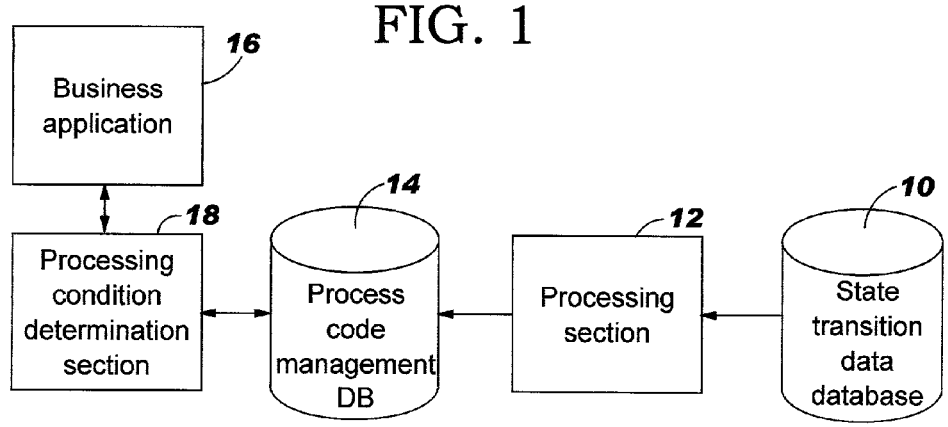
FIG. 1 is a functional block diagram showing an entire configuration of an information processing system involving the present invention.

FIG. 1 is a functional block diagram showing an entire configuration of an information processing system involving the present invention. In the execution of the present invention, a system developer first deploys each of a series of business processes in a state transition diagram. In this operation, process codes are assigned to the respective process results, and the state transition data along with the process codes is recorded in a state transition database section 10. The state transition diagram may illustrate transition of a single transition sequence (see FIG. 3) or transition of a plurality of transition sequences associated with each other (see FIG. 4).

A processing section 12 creates a process code management database (DB) 14 based on the state transition data recorded in the state transition database section 10 by extracting the processes and the corresponding process codes, conditions to allow the respective processes to be executable, and other items. The process code management database 14 stores identification information on each process, process code information that is set for each process as a condition to start the process (current code), and process code information that is set for each process to represent the state after the execution of the process, preferably in the form of a table.

A business application 16 is a plurality of programs to execute business processes, with each process corresponding to each business operation. A processing condition determination section 18 is called by the business application 16, determines if a process is executable or not with reference to the process code management database 14, and supplies the business application 16 with data on a process code as the execution result of the process. That is, exchanging the process codes via the determination section 18 allows the corresponding business processes to be executed in the business application 16.

Figure 2:
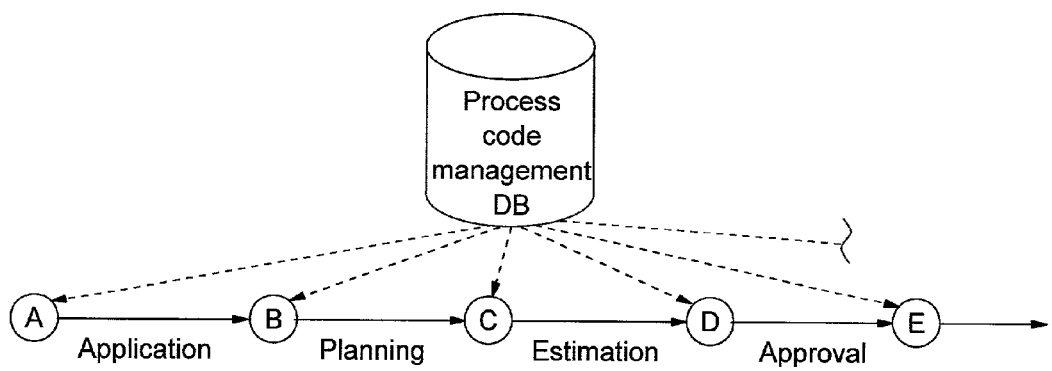
FIG. 2 is a diagram that conceptually explains the operation according to the present invention.

FIG. 2 is a diagram that conceptually explains the operation according to the present invention. Here, application, planning, estimation, and approval are shown as a series of business processes in the state transition diagram. Reference characters A through E denote process codes, which are managed in the external process code management database. The process code management database functions as a database that manages the workflow of the business processes. Here, a process code as the condition to start a process that is currently going to be executed is defined as the current code. When the current code is B, which is placed before the process "planning", the process "planning" is executed by the corresponding business application, and then the current code in the processes is changed from B to C (B is overwritten with C).

Now, consider the case in which reengineering of the business processes is needed, and one of the processes e.g. the process "planning" is to be eliminated. Conventionally, the business application itself would have to be modified. However, the present invention can accommodate reengineering by simply changing the process code (a piece of data in the process code management DB, which is the DB centrally managing the process codes) from B to C.

Next, the state transition data recorded in the database section 10 will be described with reference to FIG. 3 through FIG. 6. First, symbols and terms used in these figures will be mentioned for convenience of the subsequent description.

With regard to the process codes, syx is used as a symbol representing a "state" of a process. Here, s is a symbol representing "state", y indicates a transition sequence of the states, and x is an indicator as one of the states in the transition sequence y. Further, pyx is used as a symbol representing a "process" that changes the state or that functions in other ways. Here, p is a symbol indicating process, and y and x are similar to those representing a state mentioned above, but in this case, they represent a state to allow the process to start, or other states. It will be appreciated that different symbols may be assigned to the process codes depending on the number of the sequences or other factors.

Terms used as types of the states (syx):
Normal state—a general state;
Branch point—a state in which a process that has its transitioning destinations of different process codes branches within a single transition sequence;
Convergence point—a state in which a branched process merges into its sequence;
Transition point—an initial state in a transition sequence after transition from another transition sequence;
Return point—a state in which a transition sequence proceeding from a transition point returns to its original transition sequence.

Figure 3:
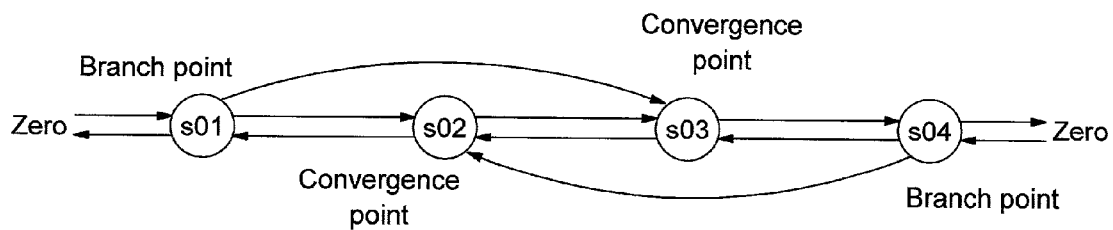
FIG. 3 is a diagram showing an example of basic state transition arranged in a single sequence.

FIG. 3 is a diagram showing an example of basic state transition arranged in a single sequence. In the present invention, after analyzing business processes, process codes are assigned to the respective process results so that the states of the processes can be managed. In FIG. 3, the transition sequence 0 (y=0) shows state transition from a state with no process to be executed ("zero") to states s01, s02, s03, and s04 in sequence as the processing goes on, then returns to zero after final processing. The transition sequence also indicates that the states s01 and s04 can perform skip processing as a branch point, with their skip destinations being the convergence points s03 and s02, respectively.

Figure 4:
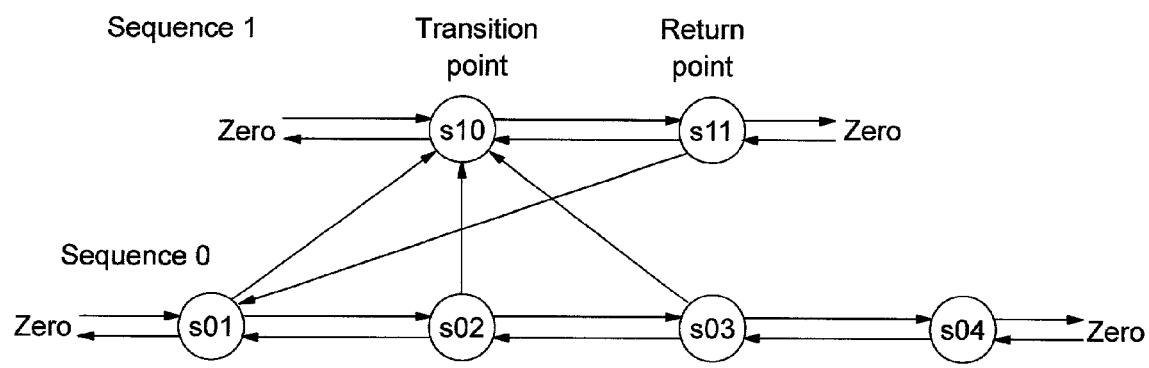
FIG. 4 is a diagram showing an example of state transition with two sequences.

In the present invention, a plurality of transition sequences can be used. FIG. 4 is a diagram showing an example of state transition with two sequences 0 and 1 (y=0 and y=1). For example, a state s10 in the sequence 1 is a transition point to which a state s01, s02, or s03 in the sequence 0 may transition. The process result of a state s11 in the sequence 1 may return to the state s01 in the sequence 0, which is a return point in the sequence 0.

To describe a more specific embodiment of the present invention, purchase operations will be used as an example to show an application in which the state transition diagram obtained as described above is arranged in coordinate space.

Figure 5:
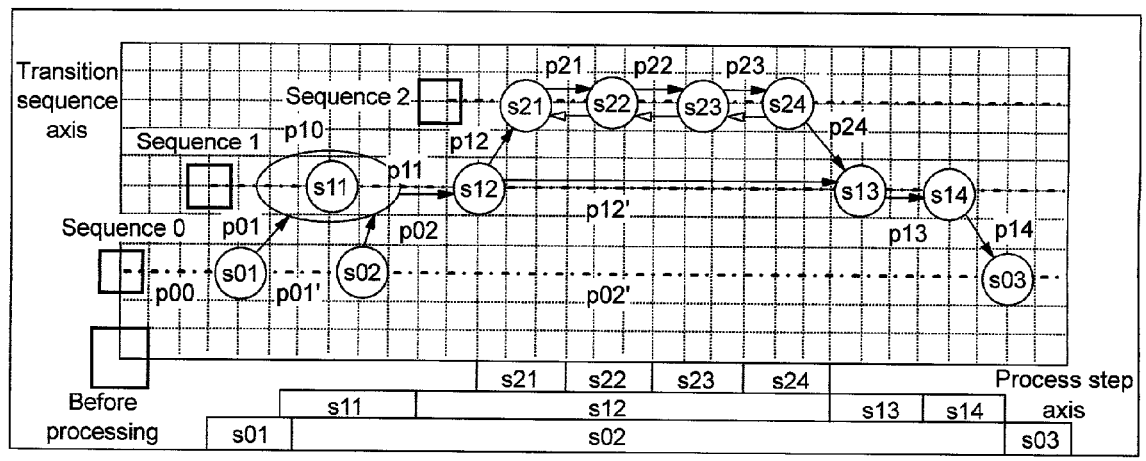
FIG. 5 is a diagram in which a state transition diagram about a purchase operation is deployed in coordinate space.

FIG. 5 is a diagram in which a state transition diagram about the purchase operations is deployed in coordinate space. In this case, states of a plurality of sequences (0, 1, and 2) are associated each other, and the state transition diagram is arranged in two dimensions with x-axis for process steps and y-axis for the transition sequences. The x-axis shows the order of the states of each sequence, and the y-axis arranges the sequences in the order in which each data is generated. This figure also shows the order of the states among the sequences 0, 1, and 2. For example, a state s11 in the sequence 1 is arranged in the coordinate so that it is processed after states s01 or s02 in the sequence 0 (arranged at the right of these states in terms of x-axis). Thus, FIG. 5 reflects the exact connection between the states of the different sequences. In addition, this figure is also provided with scales for the respective sequences below the process step axis to show connection between the states of the different sequences. With this arrangement of the scales, connection between the transition sequences is also apparent from the process step axis.

Among arrows indicating the processes, black arrows (e.g. an arrow from s01 to s11) indicate normal order processes that proceed to a sequenced state in the positive direction, and white arrows (e.g. an arrow from s22 to s21) indicate inverse order processes that proceed (return) to a sequenced state in the negative direction. In this connection, an oval is used around all to avoid visual complications when the process arrows cross over each other.

Taking the purchase operations for example, the main operations may be: 1) placement of a purchase order and inspection of it, 2) acceptance of the order and conclusion of a contract, and 3) request for quotations, acquisition and examination of the quotations. In FIG. 5, the sequence 0 is assigned to the order and inspection sequence, the sequence 1 is assigned to the acceptance and contract sequence, and the sequence 2 is assigned to the quotation sequence, wherein the workflow of the business processes is set as follows.

| Order and inspection (sequence 0) | |
|---|---|
| 00 | Prepare a purchase order slip |
| 01 | Collect purchase order slips |
| 02 | Wait for conclusion of the contract |
| 03 | Inspect the content of the order |

| Acceptance and contract (sequence 1) | |
|---|---|
| 10 | Accept the purchase order |
| 11 | Select dealers based on the order |
| 12 | Request quotations from the dealers |
| 13 | Select a contractor |
| 14 | Conclude the contract |

| Quotation (sequence 2) | |
|---|---|
| 21 | Determine quotation conditions |
| 22 | Request quotations |
| 23 | Receive the quotations |
| 24 | Investigate the quotations |

Each of the business processes is provided with a process code corresponding to the state indicating that the process has been done, i.e. the "completion state" of the process, for example, the completion state of the preparation of a purchase order slip. For example, after completion of the process to select dealers (p11), the process code s12 is recognized as the current code. It is not until this state that the process to request quotations from the dealers (p12) is made executable. In this manner, FIG. 5 shows the purchase operations as the state transition diagram, in which each of the numerals listed above are applied to the sequences, states, and processes. The transition sequences showing state transition are mutually exclusive. Accordingly, it can be considered in a sense that a sequence is a collection of data elements having common characteristics. The state transition data thus created is managed in the state transition database section 10.

Figure 6:
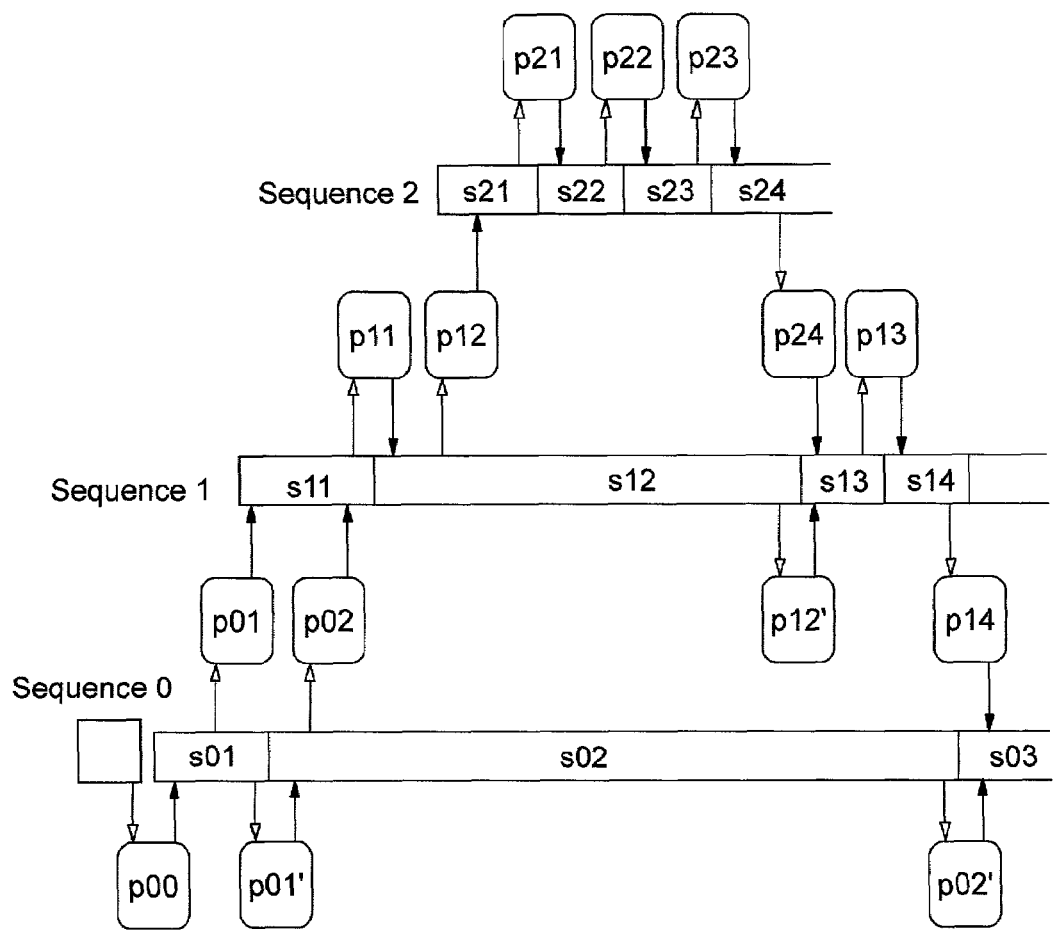
FIG. 6 is a DFD in which the diagram of FIG. 5 is deployed.

Since a transition sequence can be regarded as a collection of data elements having common characteristics, a transition sequence can be also regarded as an entity. Thus, the state transition diagram of FIG. 5 can be also deployed and managed in a DFD. FIG. 6 is a DFD in which the diagram of FIG. 5 is deployed with the transition sequences being regarded as entities. Each sequence is illustrated as a database, in which the states are arranged as the process codes in the order of the process steps. Each process box is arranged along the process step axis according to the states.

It should be noticed that the relation among the process boxes indicates physical position of the process order but not the functional similarity. In other words, arrangement in the direction of x-axis shows physical arrangement and execution order in terms of the process steps, and arrangement in the direction of y-axis shows similarity in terms of the state data. Detailed description about symbols in FIG. 6 is omitted, since FIG. 6 is another representation of FIG. 5.

Now, the method to transform the state transition data thus obtained (including the DFD in which the transition diagram is deployed) into a database that can be used in actual system development (coding) will be described. From FIG. 5 or 6, the following information can be obtained.

1) a state as a condition to start each process
2) a state as an execution result of each process For example, with regards to the process p01, it can be seen that the starting condition is that the state of the sequence 0 becomes s01, and the process result is that the data of the sequence 1 is inserted in the state s11. To manage such conditions centrally, it is convenient to have these conditions deployed in a decision table, for example. Data thus obtained is managed in the process code management database 14.

Figures 7, 8:
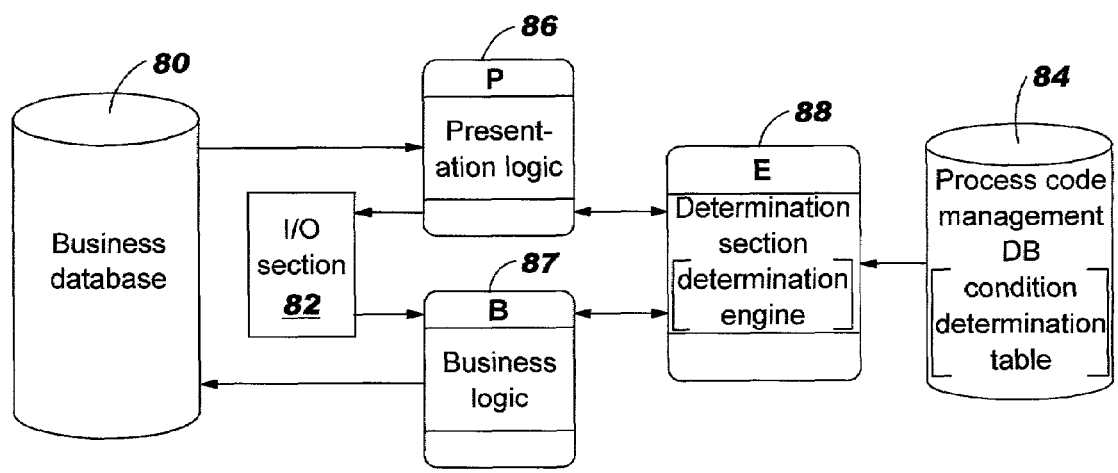
FIG. 7 is a diagram showing a table managed in a process code management database.
FIG. 8 is a diagram that explains how a system refers to the process code management database.

FIG. 7 is a diagram showing the table managed in the process code management database. The vertical axes show the states of each transition sequence and the states after completion of the respective processes. The horizontal axes show that in which state each process is executable and which sequence's state the process updates as the process result.

For example, the condition to start p12 is that the state becomes s12 of the sequence 1, and after p12 is executed, the state becomes s21 of the sequence 2. The state s21 is the condition to start p21, and it is not before the state becomes s21 that p21 becomes executable. By keeping such a table as a DB or a file and referring to it, it is possible to incorporate a mechanism to determine whether or not a business process is executable, even if the workflow is complex. Moreover, simply by changing the process codes of the table, it is possible to accommodate the reengineering of the business operations in a flexible and immediate manner without requiring any task such as recoding the entire system.

FIG. 8 is a diagram that explains how each business application of the actual developed system refers to the process code management database. The information processing system of the present invention incorporates a determination engine 88 for a decision table (condition determination table) 84 configured as a database, wherein the determination engine 88 is the determination section independent of a business application (86, 87). The determination engine 88 is initiated by each section of the business application (86, 87), and in response to the requested process, it is able to determine if the process is executable or not and to inform a next process to be executed after the proper completion of the process by referring to the state of the transition sequence involved.

In FIG. 8, it is assumed that the business application is a web application. It consists in a presentation logic 86 and a business logic 87, wherein the presentation logic 86 obtains necessary information from a business database 80 to display it on an I/O section 82, and the business logic 87 updates the business database 80 according to the input from the I/O section 82.

The presentation logic section 86 first queries the determination engine 88 if a process is executable or not before retrieving the data for display. The determination engine 88 refers to the process condition determination table 84 to determine whether the process required by the application is executable or not, and it returns the result to the presentation logic 86. If the process is determined to be executable, the presentation logic 86 obtains information necessary for display from the business database and outputs it to the I/O section 82.

The business logic section 87 first receives data from the I/O section 82, then checks it and passes information on the process to be executed to the determination engine 88. The determination engine 88 checks the state and determines if the process is executable or not while informing the business logic 87 on a next process state to be updated after completion of the process. Then, the business logic 87 updates the business data including the next process state.

By separating the determination section relating to the states (represented by the process codes) from the business application in this way, the following advantages are provided:

1) The range of modification of the business application for changes in the states is minimized.

The range and amount of modification of programs can be significantly reduced compared to the case where the states-based control is incorporated into each business application.

2) Business logic as an external table

In an embodiment where the business logic and the presentation logic are separated (as with the case of the web environment), the main part of the business logic can be handed over to the determination engine, and the development task can be centralized to the presentation logic that operates based on the states.

With the present invention, in particular the process code management database, it is possible to minimize effort, cost, and time for system improvements and changes. Moreover, it is possible to accommodate improvements and changes by simply modifying the database of the system without requiring modification of the entire system already developed. This provides a method of system development that allows for responding to requests for business process reengineering in a flexible and immediate manner. This also provides expandability for system construction at the same time.

What is claimed:

1. An information processing method, comprising the steps of:
    assigning each of a series of business processes a position in a given sequence in a state transition diagram representing a given workflow process;
    assigning process codes to results of the processes, each of the process codes being assigned to a respective one of the business processes, and each of the process codes including a first character indicating a status of the business process to which said each of the process codes is assigned, and a second character identifying the process that is next in the given sequence after the business process to which said each of the process codes is assigned, and wherein said process codes determine said given sequence of business processes;
    recording, in a state transition database, the process codes and state transition data describing states of said business processes;
    providing a process code management database based on said recorded state transition data;
    storing in said process code management database
    i) information identifying each of said business processes,
    ii) first process code information to determine whether or not to start the processes, and
    iii) second process code information to represent, after execution of each process, the state of said each executed process;
    providing a given business application to execute said processes;
    said business application calling a determination section to determine whether a specified one of said processes is executable;
    in response to said call, said determination section using said first process code information in the process code management database to determine whether said specified process is executable by said business application; and
    changing said first process code information thereby changing said given sequence of the business processes and changing said given workflow process.

2. A method according to claim 1, comprising the further step of using the determination section to inform said next process to be executed.

3. A method according to claim 2, wherein:
    the presentation logic queries the determination section if a process is executable or not; and if the process is executable, the presentation logic obtains information from a business database for display on an input/output section; and
    the business logic updates the business database according to input from the input/output section.

* * * * *